(12) United States Patent
Fernandez et al.

(10) Patent No.: US 7,389,977 B1
(45) Date of Patent: Jun. 24, 2008

(54) BODY MOUNT ASSEMBLY WITH COMBINED SHEAR AND COMPRESSION STYLE COMPONENTS

(75) Inventors: Paul M. Fernandez, Belleville, MI (US); Neil S. Cummings, Ann Arbor, MI (US); Timothy A. Rogge, Whitmore Lake, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 11/876,357

(22) Filed: Oct. 22, 2007

(51) Int. Cl.
*F16F 7/00* (2006.01)
(52) U.S. Cl. .............. 267/141.4; 296/35.1; 267/141.2; 267/293
(58) Field of Classification Search .. 267/141.1–141.7, 267/293; 296/35.1, 190.07; 248/635
See application file for complete search history.

(56) References Cited

U.S. PATENT DOCUMENTS

| | | | | |
|---|---|---|---|---|
| 3,756,551 A | * | 9/1973 | Bishop | 267/141.1 |
| 5,170,985 A | * | 12/1992 | Killworth et al. | 248/635 |
| 5,580,028 A | * | 12/1996 | Tomczak et al. | 248/634 |
| 5,743,509 A | * | 4/1998 | Kanda et al. | 248/635 |
| 6,364,296 B1 | * | 4/2002 | Cummings et al. | 267/141.4 |
| 6,435,584 B1 | | 8/2002 | Bonnville | |
| 6,502,883 B2 | | 1/2003 | Rice et al. | |
| 6,523,817 B1 | * | 2/2003 | Landry, Jr. | 267/141.4 |
| 6,588,820 B2 | * | 7/2003 | Rice | 296/35.1 |
| 6,802,498 B2 | * | 10/2004 | Makino et al. | 267/140.13 |
| 7,261,365 B2 | * | 8/2007 | Dickson et al. | 296/190.07 |
| 2006/0244188 A1 | * | 11/2006 | Johnson et al. | 267/293 |

* cited by examiner

*Primary Examiner*—Christopher P Schwartz
(74) *Attorney, Agent, or Firm*—Ronald W. Wangerow; Harness, Dickey & Pierce, P.L.C.

(57) ABSTRACT

A body mount assembly for reducing vibration between a vehicle body and a frame includes a radial isolator bushing including an inner sleeve and an outer sleeve coaxial with the inner sleeve and having an elastomeric isolation member disposed between the inner sleeve and the outer sleeve. A bottom retainer is positioned below a first end of the radial isolator bushing. An upper retainer is positioned above a second end of the radial isolator bushing. A flange bracket includes an axial sleeve portion coaxially surrounding the radial isolator bushing and a plate portion extending from an end of the axial sleeve portion and including mounting apertures adapted for mounting the flange bracket to the vehicle frame. A vertical isolator is disposed between the upper retainer and the flange bracket.

11 Claims, 2 Drawing Sheets

BODY MOUNT ASSEMBLY WITH COMBINED SHEAR AND COMPRESSION STYLE COMPONENTS

FIELD

The present disclosure relates to a vehicle body mount and more particularly, to a body mount assembly with combined shear and compression style components.

BACKGROUND

The statements in this section merely provide background information related to the present disclosure and may not constitute prior art.

Shock absorbing body mounts are well known in the automotive industry for securing and supporting the body of a vehicle to its frame. A body mount joint must isolate the vibration from the frame to the body or vice versa. By isolate, it is meant that the magnitude of a vibrational force exerted by the frame through the joint upon the body will be reduced as a result of the passage of the vibrational force through the body mount.

SUMMARY

The present disclosure provides a body mount assembly for reducing vibration between a vehicle body and a frame. The body mount includes a radial isolator bushing including an inner sleeve and an outer sleeve coaxial with the inner sleeve and having an elastomeric isolation member disposed between the inner sleeve and the outer sleeve. A bottom retainer is positioned below a first end of the radial isolator bushing. An upper retainer is positioned above a second end of the radial isolator bushing. A flange bracket includes an axial sleeve portion coaxially surrounding the radial isolator bushing and a plate portion extending from an end of the axial sleeve portion and including mounting apertures adapted for mounting the flange bracket to the vehicle frame. A vertical isolator is disposed between the upper retainer and the bracket.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
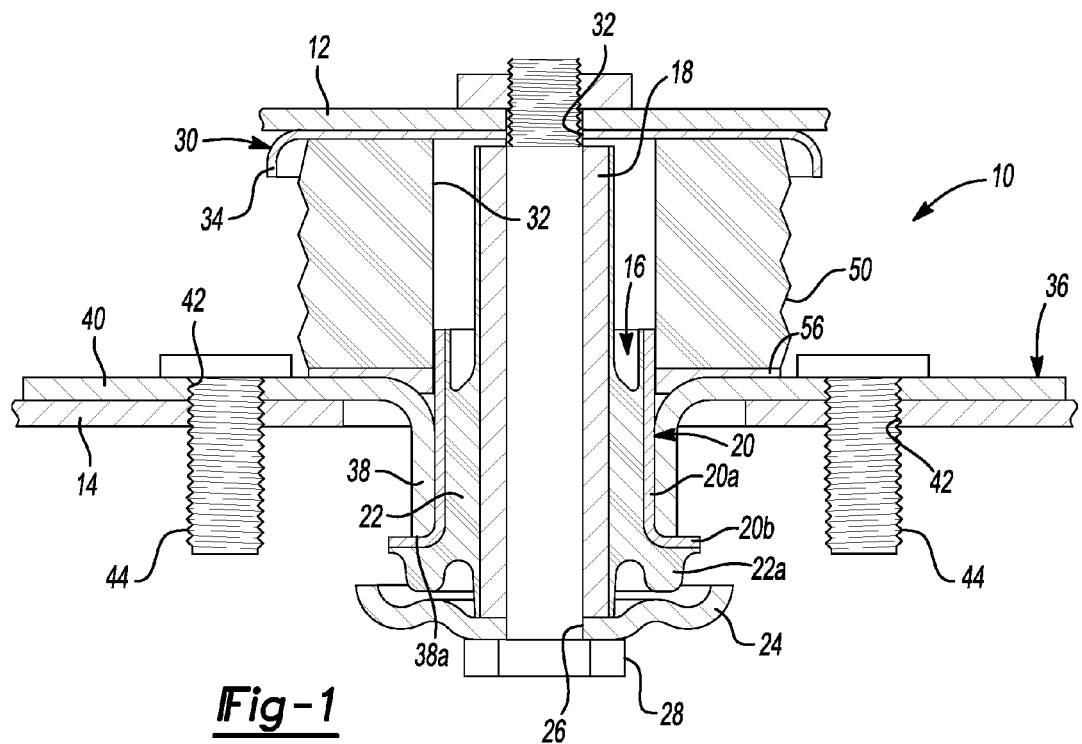
FIG. 1 is a cross-sectional view of the body mount assembly according to the principles of the present disclosure.

The following description is merely exemplary in nature and is not intended to limit the present disclosure, application, or uses. It should be understood that throughout the drawings, corresponding reference numerals indicate like or corresponding parts and features.

Figure 2:
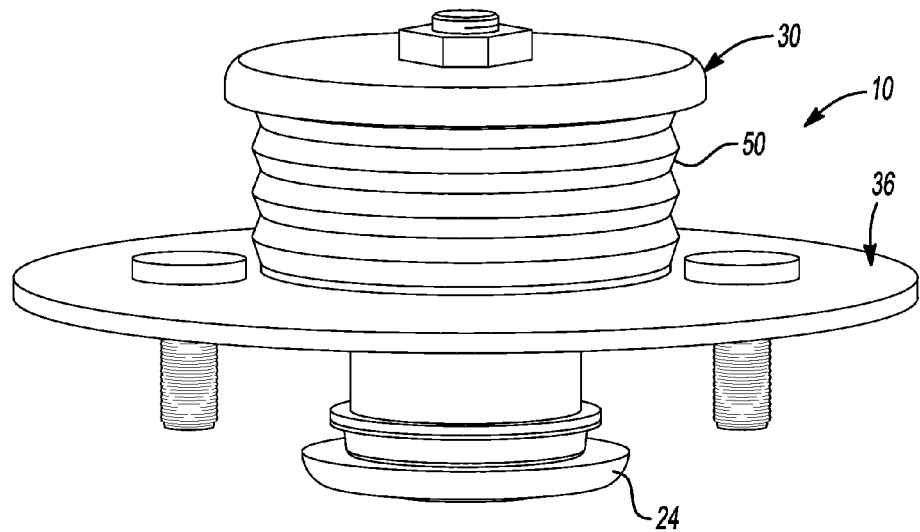
FIG. 2 is a perspective view of the body mount assembly shown in FIG. 1.

With reference to FIGS. 1 and 2, the body mount assembly 10 according to the principles of the present disclosure will now be described. The body mount assembly 10 is provided for mounting a vehicle body 12 to a vehicle frame 14.

The body mount assembly 10 includes a radial isolator bushing 16 including an inner sleeve 18 and an outer sleeve 20 coaxial with the inner sleeve 18 and having an elastomeric isolation member 22 disposed between the inner sleeve 18 and the outer sleeve 20. The inner sleeve 18 of the radial isolator 16 can be a cylindrical tube having a generally cylindrical inner wall surface and a generally cylindrical outer wall surface, although other shapes can be utilized. The outer sleeve 20 of the radial isolator bushing 16 can include an axially extending cylindrical portion 20a spaced radially outward from the inner sleeve 18 by a predetermined amount. The outer sleeve 20 can also include a radially outwardly extending flange portion 20b extending from a lower end of the cylindrical portion 20a. A gap is defined between the inner sleeve 18 and the outer sleeve 20 of the radial isolator bushing 16 and an elastomeric isolation member 22 is molded within the gap between the inner sleeve 18 and the outer sleeve 20. The elastomeric isolation member 22 can be made of rubber or other elastomeric materials and can further include a bumper portion 22a extending axially from a bottom surface of the radially extending flange portion 20b of the outer sleeve 20.

A bottom retainer 24 is positioned below a lower end of the radial isolator bushing 16. The bottom retainer 24 can be formed from metal or other material and can include a central aperture 26 for receiving a mounting bolt 28 of the body mount assembly 10. An upper retainer 30 is positioned above a second end of the radial isolator bushing 16. The upper retainer 30 can be made from metal or other materials, and can include a central aperture 32 for receiving the bolt 28 therein. The upper retainer 30 can include a bent axial flange 34 disposed at a radially outermost portion of the upper retainer 30.

A flange bracket 36 includes an axial sleeve portion 38 co-axially surrounding the radial isolator bushing 16 such that the axial portion 20a of the outer sleeve 20 of the radial isolator bushing 16 is in close proximity to the axial portion 38 of the flange bracket 36. The flange bracket 36 also includes a plate portion 40 extending radially outward from an end of the axial sleeve portion 38 and including mounting apertures 42 for receiving mounting bolts 44 for mounting the flange bracket 36 to the vehicle frame 14. The axially extending portion 38 of the flange bracket 36 can have an end portion 38a disposed against the radially extending flange portion 20b of the outer sleeve 20 of the radial isolator bushing 16.

A vertical isolator 50 can be located between the upper retainer 30 and the flange bracket 36. The vertical isolator 50 can have a generally cylindrical shape with a generally cylindrical inner surface 52 having a diameter sufficient to receive at least a portion of the radial isolator bushing 16. A plate/washer 56 can be disposed between a bottom surface of the vertical isolator 50 and the bracket 36. The vertical isolator 50 can be made from a microcellular urethane, or can be formed from other known vibration isolation materials.

Figure 3:
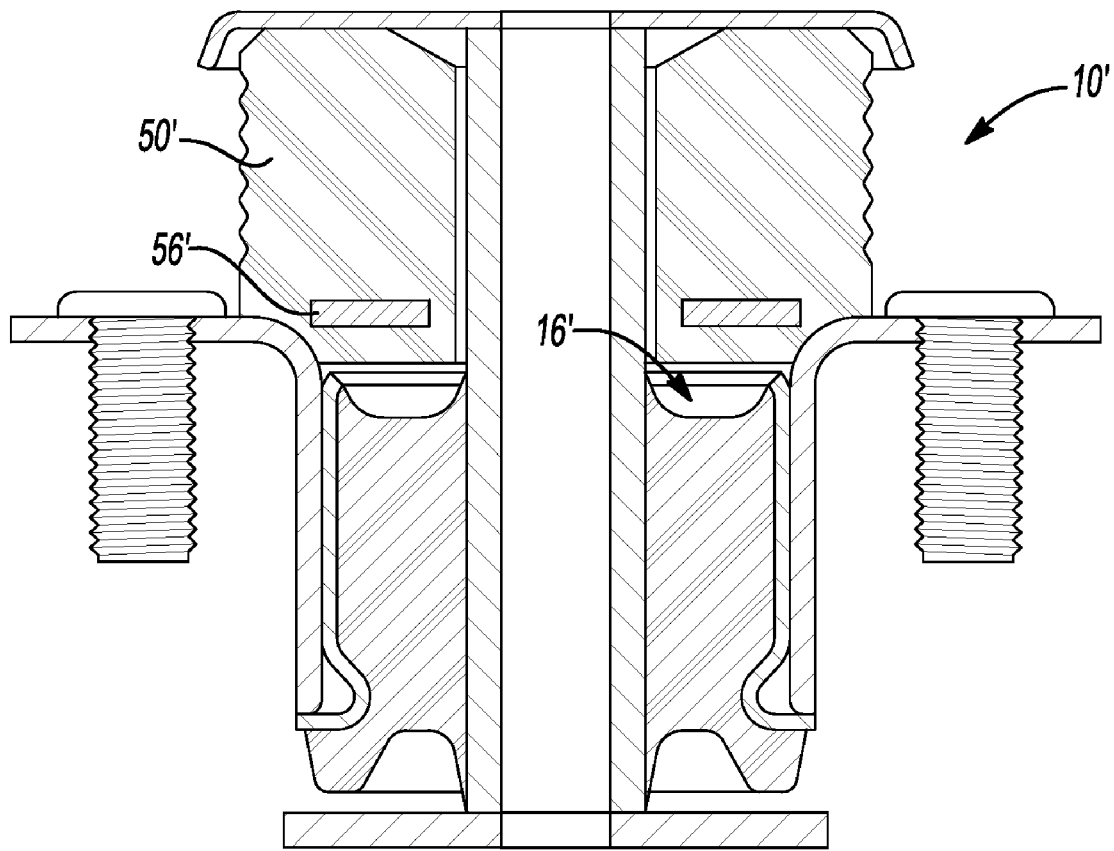
FIG. 3 is a cross-sectional view of an alternative body mount assembly according to the principles of the present disclosure.

As an alternative to the embodiment as shown in FIG. 1, the bottom mount assembly 10', as shown in FIG. 3, utilizes a reinforcement plate 56' that is molded into the vertical isolator 50'. Furthermore, as shown in FIG. 3, the radial isolator bushing 16' is shown having a diameter greater than the inner diameter of the vertical isolator so that the radial isolator bushing 16' is not received within the inner diameter of the vertical isolator 50'.

It should be noted that the height and diameter of the vertical isolator 50, 50' can be specifically tuned to a specific application. Furthermore, the spacing between the inner sleeve 18 and outer sleeve 20 of the radial isolator bushing 16 can be varied in order to provide desired lateral and fore/aft vibration characteristics.

What is claimed is:

1. A body mount assembly for connection between a vehicle body and frame, comprising:
    a radial isolator bushing including an inner sleeve and an outer sleeve coaxial with said inner sleeve and having an elastomeric isolation member disposed between said inner sleeve and said outer sleeve;
    a bottom retainer positioned below a first end of said radial isolator bushing;
    an upper retainer positioned above a second end of said radial isolator bushing;
    a flange bracket including an axial sleeve portion coaxially surrounding said radial isolator bushing and including a radial portion extending from an end of said axial sleeve portion and including mounting apertures adapted for mounting said flange bracket to the vehicle frame; and
    a vertical isolator disposed between said upper retainer and said bracket.

2. The body mount according to claim 1, wherein said radial isolator includes elastomeric material disposed opposite said bottom retainer.

3. The body mount according to claim 1, wherein said outer sleeve of said radial isolator includes a radially extending flange extending from a lower end of said outer sleeve.

4. The body mount according to claim 3, wherein said radial isolator includes elastomeric material attached to a lower end of said radially extending flange opposite said bottom retainer.

5. The body mount according to claim 1, wherein said elastomeric material of said lateral isolator is molded to said inner sleeve and said outer sleeve.

6. The body mount according to claim 1, wherein said vertical isolator is made from microcellular urethane, or other elastomeric material.

7. The body mount according to claim 1, further comprising a plate disposed between said vertical isolator and said bracket.

8. The body mount according to claim 1, wherein said inner sleeve of said radial isolator and said upper and bottom retainers each include a central aperture therein.

9. A body mount assembly for connection between a vehicle body and frame, comprising:
    a radial isolator bushing including an inner sleeve and an outer sleeve coaxial with said inner sleeve and having an elastomeric isolation member molded between said inner sleeve and said outer sleeve, said outer sleeve of said radial isolator includes a radially extending flange extending from a lower end of said outer sleeve;
    a bottom retainer positioned below a first end of said radial isolator bushing wherein said radial isolator includes elastomeric material disposed opposite said bottom retainer;
    an upper retainer positioned above a second end of said radial isolator bushing;
    a flange bracket including an axial sleeve portion coaxially surrounding said radial isolator bushing and including a radial portion extending from an end of said axial sleeve portion and including mounting apertures adapted for mounting said flange bracket to the vehicle frame; and
    a vertical isolator made from microcellular urethane or other elastomeric material and disposed between said upper retainer and said flange bracket.

10. The body mount according to claim 9, further comprising a plate disposed between said vertical isolator and said flange bracket.

11. The body mount according to claim 9, wherein said inner sleeve of said radial isolator and said upper and bottom retainers each include a central aperture therein.

* * * * *